(12) United States Patent
Ikeno et al.

(10) Patent No.: US 8,970,611 B2
(45) Date of Patent: Mar. 3, 2015

(54) DISPLAY DEVICE AND METHOD FOR TRANSFERRING IMAGE DATA

(75) Inventors: Kazuo Ikeno, Shimada (JP); Daisuke Satsukawa, Susono (JP)

(73) Assignee: Yazaki Corporation, Tokyo (JP)

(*) Notice: Subject to any disclaimer, the term of this patent is extended or adjusted under 35 U.S.C. 154(b) by 84 days.

(21) Appl. No.: 13/248,118

(22) Filed: Sep. 29, 2011

(65) Prior Publication Data
US 2012/0075318 A1    Mar. 29, 2012

(30) Foreign Application Priority Data

Sep. 29, 2010    (JP) .................................. 2010-218435

(51) Int. Cl.
| G06F 13/00 | (2006.01) |
| G09G 5/39 | (2006.01) |
| G09G 5/393 | (2006.01) |
| G06F 3/14 | (2006.01) |
| G09G 3/36 | (2006.01) |

(52) U.S. Cl.
CPC .............. *G09G 5/393* (2013.01); *G09G 3/3622* (2013.01); *G09G 2380/10* (2013.01); *G06F 3/14* (2013.01)
USPC ............................ 345/537; 345/531; 345/538

(58) Field of Classification Search
None
See application file for complete search history.

(56) References Cited

U.S. PATENT DOCUMENTS

| 4,467,447 A | * | 8/1984 | Takahashi et al. ............... 710/27 |
| 4,777,485 A | * | 10/1988 | Costello ......................... 345/572 |
| 5,079,692 A | * | 1/1992 | Takeda ........................... 710/306 |
| 5,430,853 A | * | 7/1995 | Arakawa ......................... 710/22 |
| 5,664,161 A | * | 9/1997 | Fukushima et al. ........... 345/538 |
| 5,892,521 A | * | 4/1999 | Blossom et al. ............... 345/501 |
| 6,166,724 A | * | 12/2000 | Paquette et al. ............... 345/537 |
| 6,430,853 B1 | | 8/2002 | Choi |
| 6,550,014 B2 | * | 4/2003 | Satoh et al. .................... 713/501 |
| 6,956,579 B1 | * | 10/2005 | Diard et al. .................... 345/537 |
| 8,095,699 B2 | * | 1/2012 | Garg et al. ..................... 710/20 |
| 8,332,683 B2 | * | 12/2012 | Satoh et al. .................... 713/600 |
| 2009/0225094 A1 | * | 9/2009 | Fouladi et al. ................. 345/535 |

FOREIGN PATENT DOCUMENTS

JP    2007-248965 A    9/2007

OTHER PUBLICATIONS

German Office Action dated Sep. 4, 2014 in connection with German Patent Application No. 10 2011 083 618.7, with English translation.

* cited by examiner

*Primary Examiner* — Joni Richer
*Assistant Examiner* — Yi Wang
(74) *Attorney, Agent, or Firm* — Locke Lord LLP

(57) ABSTRACT

For providing a display device and a method for transferring an image data, shortening process time required to transfer image data without greater processing capacity, the CPU 4 outputs the bypass write signal to the GDC 6, the CPU 4 then outputs the read signal to both the ROM 5 and the GDC 6, and the ROM 5 outputs the image data to the data bus 8 according to input of the read signal, wherein the GDC 6 directly reads the image data outputted on the data bus 8 according to input of the read not through the CPU 4 and writes the read image data to the VRAM 7.

2 Claims, 4 Drawing Sheets

DISPLAY DEVICE AND METHOD FOR TRANSFERRING IMAGE DATA

CROSS REFERENCE TO RELATED APPLICATIONS

This application is on the basis of Japanese Patent Application NO. 2010-218435, the contents of which are hereby incorporated by reference.

BACKGROUND OF THE INVENTION

1. Field of the Invention

The present invention relates to a display device and a method for transferring image data.

2. Description of the Related Art

Well-known as a display device mentioned above is, e.g., what is shown in FIG. 3 (Patent Document 1). As shown in the FIG. 3 the display device 1 includes a CPU 4 controlling the whole display device 1 as a first controller, a ROM 5 in which an image data is stored as a first memory, a graphic display controller 6 (hereafter referred to as a GDC) controlling a driver 3 and displaying the image data on a liquid crystal display 2, a VRAM 7 temporally storing the image data displayed on the liquid crystal display 2 as a second memory, and a data bus 8 mutually connecting the CPU 4, the ROM 5 and the GDC 6.

The display device 1 is required to temporally transfer and store the image data stored in the ROM 5 to the VRAM 7 in order to display the image data stored in the ROM 5 on the liquid crystal display 2.

As a conventional method for transferring, steps shown in FIG. 4 are performed. FIGS. 4 (A) to (E) each show a time chart of a read signal of the display device 1 shown in FIG. 3, a state of the ROM 5, a write signal, a state of the GDC 6, and the image data on the bus 8. First, the CPU 4 outputs a read signal to the ROM 5 (FIG. 4 (A)). The ROM 5, corresponding to output of the read signal, outputs the image data onto the data bus 8 (FIG. 4 (B), (E)). The CPU 4 reads the image data outputted on the data bus 8 and stores the image data into the internal memory not shown.

Completing reading, the CPU 4 outputs a write signal to the GDC 6 (FIG. 4 (C)) while outputting the image data onto the data bus 8 (FIG. 4 (E)). The GDC 6, corresponding to the write signal, reads the image data outputted on the data bus 8 and writes the image data into the VRAM 7 (FIG. 4 (D), (E)).

However, in the method above mentioned, the CPU 4 has been required to read the image data stored in the ROM 5 before writing the image data from the CPU 4 via the GDC 6 into the VRAM 7. Namely, there has been a problem in which the conventional method for transferring mentioned above has been required to perform two steps of reading and writing, causing much time for transferring.

[Patent Document 1] JP, A, 2007-248965

An object of the present invention is to provide a display device and a method for transferring image data achieving shortening process time required to transfer image data without greater processing capacity.

SUMMARY OF THE INVENTION

To achieve the above object, the invention recited in claim 1 relates to a display device comprising a first memory for being stored of an image data, a second memory for being transferred of the image data stored in the first memory, a first controller reading the image data stored in the first memory, a second controller writing the image data in the second memory, and, a data bus mutually connecting the first memory, the first controller and the second controller, wherein when the first controller outputs a read signal to the first memory and the second controller for reading the image data stored in the first memory, the first memory outputs the image data to the data bus, and wherein the second controller reads the image data outputted to the data bus according to input of the read signal directly by avoiding the first controller and writes the read image data into the second memory.

The invention recited in claim 2 relates to a display device as claimed in claim 1, wherein the first controller outputs a bypass write signal for instructing the second controller to transfer the image data, wherein when the bypass write signal is outputted during the read signal being outputted, the second controller reads the image data outputted in the data bus and writes the read image data on the second memory.

The invention recited in claim 3 relates to a method for transferring image data in a display device including a first memory for being stored of an image data, a second memory for being transferred of the image data stored in the first memory, a first controller reading the image data stored in the first memory, a second controller writing the image data in the second memory, and a data bus mutually connecting the first memory, the first controller and the second controller, the first memory outputting the image data to the data bus upon the first controller outputting a read signal to the first memory for reading the image data stored in the first memory, the method transferring the image data stored in the first memory to the second memory, the method comprising the steps of outputting a read signal to both the second controller and the first memory by using the first controller, outputting the image data onto the data bus according to input of the read signal by using the first memory, reading the image data outputted onto the data bus according to input of the read signal directly by avoiding the first controller, and writing the read image data into the second memory by using the second controller.

ADVANTAGEOUS EFFECTS OF INVENTION

According to the invention recited in claims 1 and 3, as mentioned above, since the second controller reads the image data outputted to the data bus according to input of the read signal directly not through the first controller and writes the read image data into the second memory, process that would have been required of two processes for reading and writing is achieved by one step for reading, leading to shortening process time required to transfer image data without greater processing capacity.

According to the invention recited in claims 2, the image data can be transferred only during a bypass write signal being outputted.

DETAILED DESCRIPTION OF THE PREFERRED EMBODIMENTS

Figure 1:
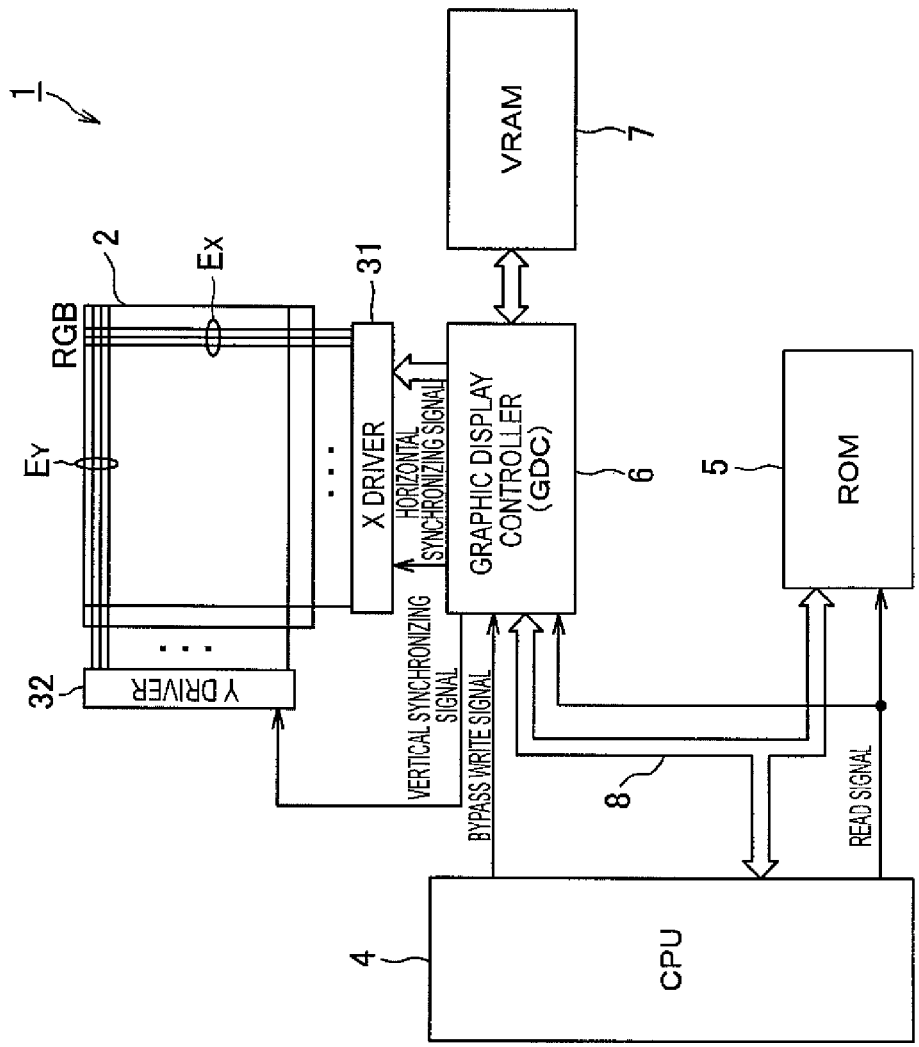
FIG. 1 is a block diagram illustrating one embodiment of a display device according to the invention.

Hereafter a display device according to the invention will be described based on accompanying drawings. FIG. 1 is a block diagram illustrating one embodiment of a display device according to the invention. As shown in FIG. 1, the display device 1 comprises a liquid crystal display 2, an X driver 31 and Y driver 32 driving the liquid crystal display 2, a CPU 4 administering a whole control of the display device 1 as a first controller, a ROM 5 in which an image data is stored as a first memory, a GDC 6 controlling the X driver 31 and Y driver 32 and displaying the image data on the liquid crystal display 2, and a VRAM 7 in which the image data to be displayed on the liquid crystal display 2 is temporally stored as a second memory, and a data bus mutually connecting the CPU 4, the ROM 5 and the GDC 6.

The liquid crystal display 2 mentioned above includes Y-row and X-column liquid crystal elements arranged in a matrix shape, a pair of transparent electrodes interleaving each of the Y-row and X-column liquid crystal elements, and an area light source disposed a backside of the Y-row and X-column liquid crystal elements (both not shown). Each of liquid crystal elements is sequentially provided with color filter of R (Red), G (Green) and B (Blue). This liquid crystal display 2 is arranged on a control panel in a vehicle.

One of the pair of liquid crystal elements is connected to each other every row. Each of transparent electrodes $E_Y$ of Y-row connected to each other every row is connected to Y driver 32. The other of the pair of liquid crystal elements is connected to each other every column. Each of transparent electrodes $E_X$ of X-row connected to each other every row is connected to X driver 31.

The CPU 4 above mentioned is connected to the ROM 5 by a signal line, through which the CPU 4 outputs a read signal to the ROM 5. The ROM 5, upon the read signal being outputted, outputs the stored image data onto the data bus 8. For transmitting the read signal, the signal line connected between the CPU 4 and the ROM 5 is bifurcated, and connected to the GDC 6. I.e., the read signal outputted from the CPU 4 is outputted to both the ROM 5 and the GDC 6. The CPU 4 outputs a bypass write signal to the GDC 6. The GDC 6 writes the image data outputted on the data bus 8 to the VRAM 7 when the read signal is outputted during the bypass write signal being outputted.

The GDC 6 also transforms the image data temporally stored in the VRAM 7 into a RGB signal, a tone data, or the like, and drives the X driver 31 and the Y driver 32 according to the RGB signal or the tone data. Specifically, the GDC 6 outputs a vertical synchronizing signal to the Y driver 32. The Y driver 32 sequentially selects one of the Y-row electrodes $E_y$ in synchronization with the vertical synchronizing signal, and prepares for supplying voltage for liquid crystal elements connected to the selected Y-row electrode $E_y$.

The GDC 6 outputs a horizontal synchronizing signal to the X driver 31 while also outputting the RGB signal or tone data in synchronization with the horizontal synchronizing signal to the X driver 31. The X driver 31 sequentially selects one of X column electrodes $E_X$ in synchronization with the horizontal synchronizing signal, and supplies voltage according to the RGB signal and tone data to the liquid crystal elements connected to the selected X column electrode $E_X$. I.E., a point where a row selected by the Y driver 32 intersects a column selected by the X driver 31 can display what corresponds to the RGB signal or the tone data. Then by sequentially supplying voltage according to the RGB signal or tone data to all liquid crystal elements selected by the X driver 31 and Y driver 32, an image corresponding to the image data can displayed on the liquid crystal display 2.

Figure 2:
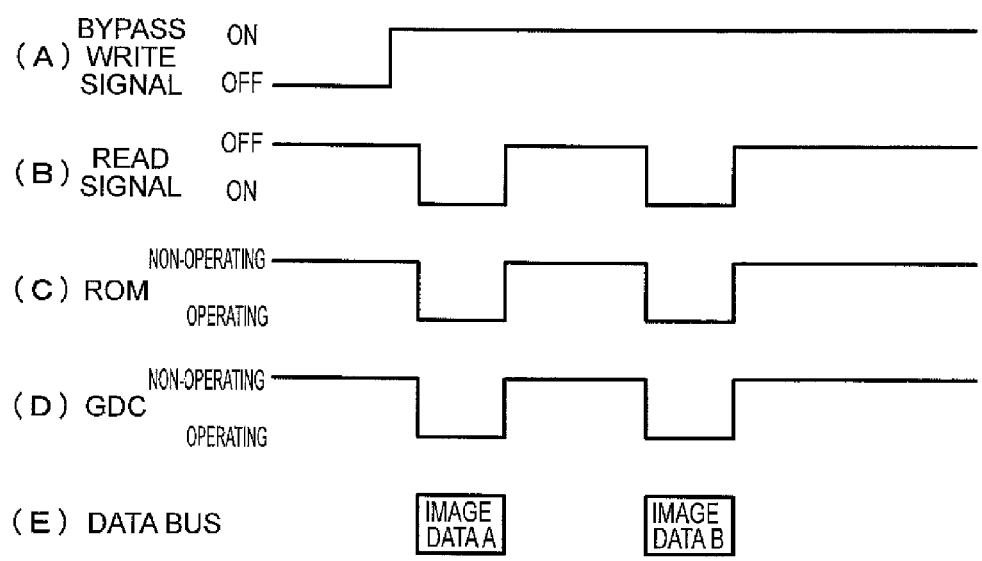
FIG. 2 is a time chart in which (A) to (E) illustrate a bypass write signal, a read signal, a state of a ROM, a state of a GDC, and an image data on a data bus, respectively, in the display device 1 shown in FIG. 1.
Figure 3:
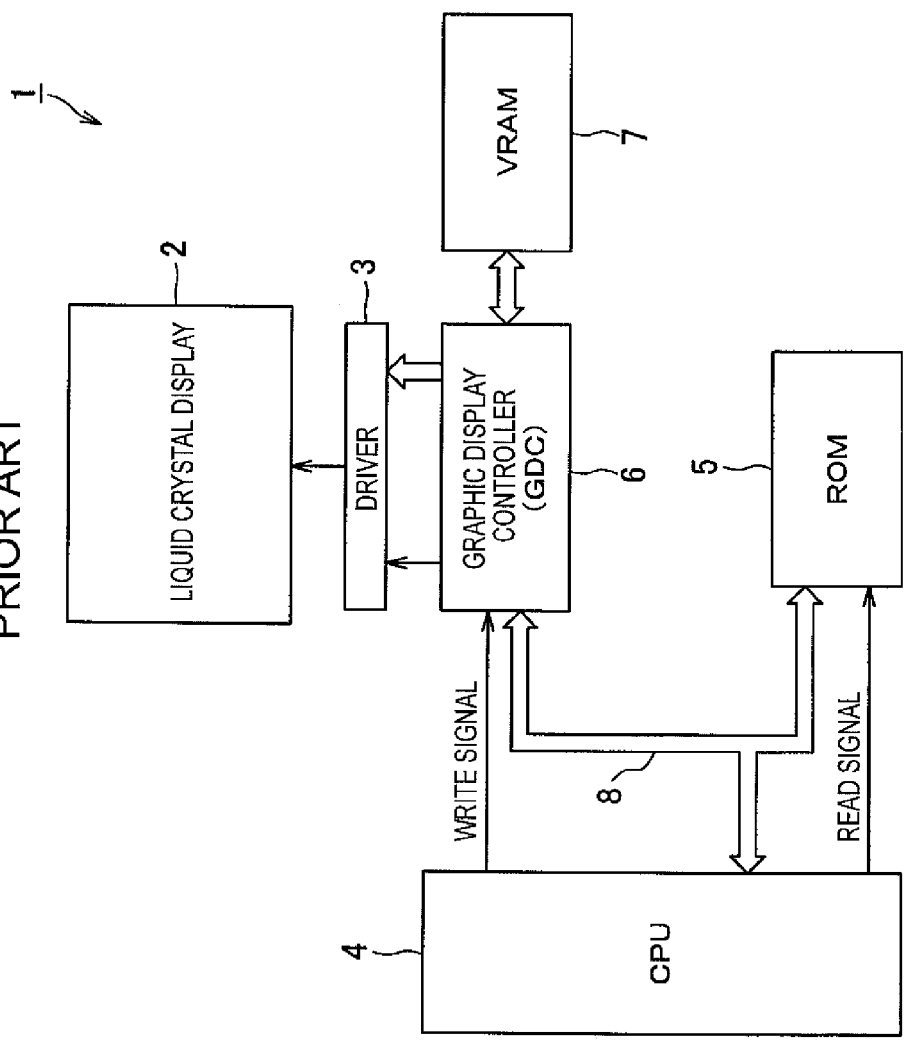
FIG. 3 is a block diagram illustrating one example of a conventional display device.
Figure 4:
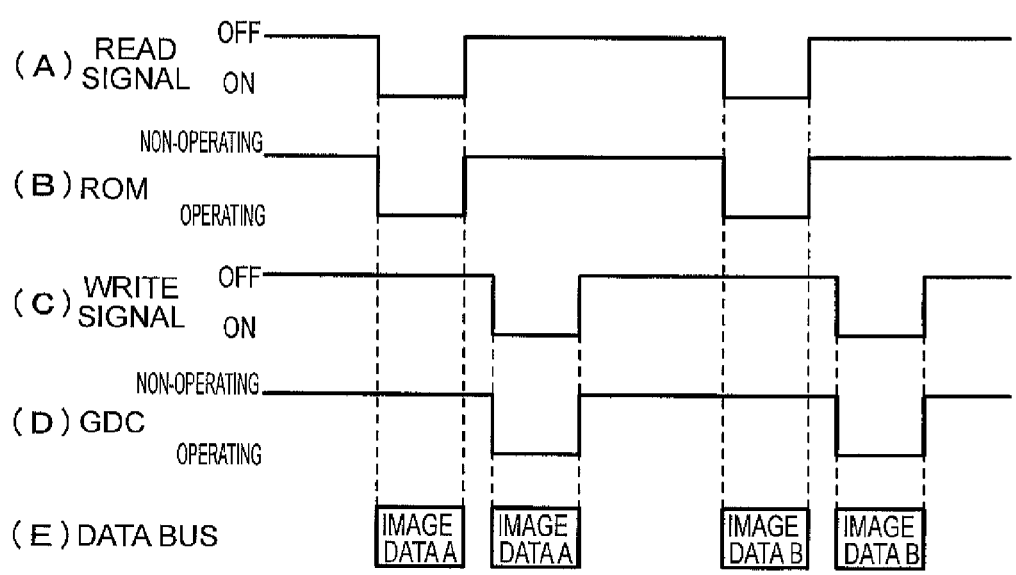
FIG. 4 is a tame chart in which (A) to (E) illustrates a read signal, a state of a ROM, a write signal, a state of a GDC, and an image data on a data bus, respectively, in the display device shown in FIG. 3.

The operation of the display device 1 as configured mentioned above is next described in reference to a time chart of FIG. 2. FIG. 2 is a time chart in which (A) to (E) illustrate a bypass write signal, a read signal, a state of a ROM, a state of a GDC, and an image data on a data bus, respectively, in the display device 1 shown in FIG. 1. First, for transferring the image data stored in the ROM 5 to the VRAM 7, the CPU 4 outputs the bypass write signal to the GDC 6 (FIG. 2 (A)).

Then, the CPU 4 outputs the read signal to both the ROM 5 and the GDC 6 (FIG. 2 (B)). The ROM 5 commences operation according to input of the read signal to output the image data to the data bus 8 (FIG. 2 (C), (E)). When the read signal is outputted during the bypass write signal being outputted, the GDC 6 directly reads the image data outputted on the data bus 8 not through the CPU 4 and writes the read image data to the VRAM 7 (FIG. 2 (D)).

According to the display device 1 mentioned above, as shown in FIG. 2, since the GDC 6 directly reads the image data outputted on the data bus 8 according to the read signal and writes the read image data to the VRAM 7, process that would have been required of two processes for reading and writing is achieved by one step for reading, leading to shortening process time required to transfer image data without greater processing capacity.

According to the display device 1 mentioned above, since the GDC 6 reads the image data outputted on the data bus 8 according to the read signal and writes the read image data to the VRAM 7 only during the bypass write signal being outputted. The image data can thus be transferred only during the bypass write signal being outputted.

Note that according to the display device 1 mentioned above, although GDC 6 is assumed as a second controller, it is not intended to limit therewithin in the present invention. For example, if the CPU 4 itself can drive the X drier 31 and the Y driver 32, a second controller may be disposed in the VRAM 7, reading and writing the image data outputted on the data bus 8 during the read signal being outputted.

Since the embodiment mentioned above only shows a typical configuration of the present invention, it is to be understood that various changes and modifications will be apparent to those skilled in the art. Therefore, unless otherwise such changes and modifications depart from the scope of the present invention hereafter defined, they should be construed as being included therein.

What is claimed is:

1. A display device comprising:
   a first memory for storing an image data;
   a second memory, to which the image data stored in the first memory is transferred;
   a first controller reading the image data stored in the first memory and outputting the data to a data bus;
   a second controller reading the image data from the data bus and then writing the image data to the second memory; and
   a single read signal line to which the read signal is outputted from the first controller, directly connected to the first controller, the first memory, and the second controller,
   wherein the data bus is mutually connected to the first memory, the first controller and the second controller;
   wherein when the first controller outputs a read signal to the read signal line, the image data is outputted to the data bus from the first memory;
   wherein the second controller reads directly the image data outputted to the data bus while avoiding the first controller and directly writes the read image data into the second memory according to the read signal inputted to the second controller via the single read signal line, wherein the first controller outputs a bypass write signal for instructing the second controller to transfer the image data, the bypass signal different from the read signal and being outputted at least during the read signal being outputted, and wherein when the bypass write signal is outputted during the read signal being outputted, the second controller reads the image data outputted in the data bus and writes the read image data on the second memory.

2. A method for transferring an image data in a display device including a first memory for storing an image data, a second memory to which the image data stored in the first memory is transferred, a first controller reading the image data stored in the first memory and outputting the data to a data bus, a second controller reading the data from the data bus and then writing the image data to the second memory, and a single read signal line to which the read signal is outputted from the first controller directly connected to the first controller, the first memory, and the second controller, wherein the data bus is mutually connected to the first memory, the first controller and the second controller, the first memory outputting the image data to the data bus upon the first controller outputting a read signal to the first memory that outputs the image data to the data bus for reading the image data stored in the data bus, the method transferring the image data stored in the data bus via the first memory to the second memory, the method comprising the steps of:

outputting a read signal to both the second controller and the first memory by using the first controller;

outputting the image data onto the data bus according to input of the read signal directly while avoiding the first controller; and directly writing the read image data into the second memory by using the second controller according to the read signal inputted to the second controller via the single read signal line, wherein the first controller outputs a bypass write signal for instructing the second controller to transfer the image data, the bypass signal different from the read signal and being outputted at least during the read signal being outputted, and wherein when the bypass write signal is outputted during the read signal being outputted, the second controller reads the image data outputted in the data bus and writes the read image data on the second memory.

* * * * *